United States Patent [19]
Thrash et al.

[11] Patent Number: 5,488,624
[45] Date of Patent: Jan. 30, 1996

[54] RARE EARTH ION UPCONVERSION LASER SYSTEM

[75] Inventors: Robert J. Thrash, St. Charles, Ill.; Leo F. Johnson, Bedminster, N.J.

[73] Assignee: Amoco Corporation, Chicago, Ill.

[21] Appl. No.: 195,790

[22] Filed: Feb. 8, 1994

Related U.S. Application Data

[63] Continuation-in-part of Ser. No. 765,381, Sep. 25, 1991, Pat. No. D. 341,719.

[51] Int. Cl.$^6$ .................................................. H01S 3/16
[52] U.S. Cl. ........................................................ 372/41
[58] Field of Search ........................... 372/41, 39, 69–71

[56] References Cited

U.S. PATENT DOCUMENTS

| 3,621,340 | 11/1971 | Slughsummit | 372/41 |
| 5,173,911 | 12/1992 | Faure et al. | 372/41 |
| 5,299,210 | 3/1994 | Snitzer et al. | 372/41 |
| 5,299,215 | 3/1994 | Thrash et al. | 372/41 |

Primary Examiner—Léon Scott, Jr.
Attorney, Agent, or Firm—Stephen G. Mican

[57] ABSTRACT

An upconversion laser system that uses solid state components throughout and achieves such operation with a substantially coherent, continuous or quasi-continuous single band infrared pumping source using successive energy transfers between the sensitizer and activator in the host of the lasant upconversion material.

6 Claims, 4 Drawing Sheets 5,488,624

RARE EARTH ION UPCONVERSION LASER SYSTEM

CROSS-REFERENCE TO RELATED APPLICATIONS

This application is a continuation-in-part of U.S. Ser. No. 07/765,381 that was filed on Sep. 25, 1991, now D 341,719.

BACKGROUND OF THE INVENTION

This invention relates to lasers that produce coherent radiation that has a shorter wavelength than the wavelength of the pumping radiation, and more particularly to lasers that use a rare earth doped solid state lasing medium under ambient temperature conditions to provide upconverted laser radiation from the ultraviolet through the infrared portions of the electromagnetic spectrum.

Laser systems that produce wavelengths in the blue and green portions of the visible spectrum are highly desirable for a variety of applications. These applications include laser based video display systems and optical systems wherein the higher resolutions afforded by short optical wavelengths are important, such as optical storage systems.

Although laser systems have been developed that produce outputs in the blue and green portions of the visible spectrum, the value of such systems have been diminished by one or more factors that include high cost, critical alignment and high maintenance. For instance, rare gas ion lasers have both a high purchase price and a high degree of maintenance. Frequency doubling or summing lasers that employ a nonlinear element require critical alignment and high maintenance. Also, systems that use non-coherent pumping sources, such as flash lamps and arrays of semiconductor diodes, are impractical for efficient upconversion systems.

A laser source that uses solid state components throughout and employs a single diode laser pumping source is a desirable configuration for a low cost, low maintenance system, but such lasers-have never been able to achieve operation in the blue and green regions of the visible spectrum under normal ambient temperature operating conditions. Furthermore, the prior art has not been able to achieve such operation With a continuous or quasi-continuous coherent pumping source.

SUMMARY OF THE INVENTION

The invention comprises a solid state laser system with a lasant material that comprises a host doped with an activator material that produces coherent radiation in the blue, green, red and infrared regions of the electromagnetic spectrum and a sensitizer that allows the lasing material to be pumped with infrared radiation provided by a single band, substantially coherent infrared pumping source. The infrared pumping source conveniently comprises a solid state infrared laser source such as a laser diode.

In the preferred embodiment, the invention comprises an active lasant material comprising a host, an activator comprising a concentration of rare earth ions in said host for producing coherent radiation having a shorter wavelength than said single band infrared radiation, and a sensitizer comprising a concentration of sensitizer ions in said host for sensitizing said activator in said host to said infrared radiation; an optical cavity for resonating said coherent radiation produced by said lasant material; and a pumping source for pumping said lasant material that has at least a substantially coherent, quasi-continuous output of said single band infrared radiation.

DESCRIPTION OF THE INVENTION

Figure 1:
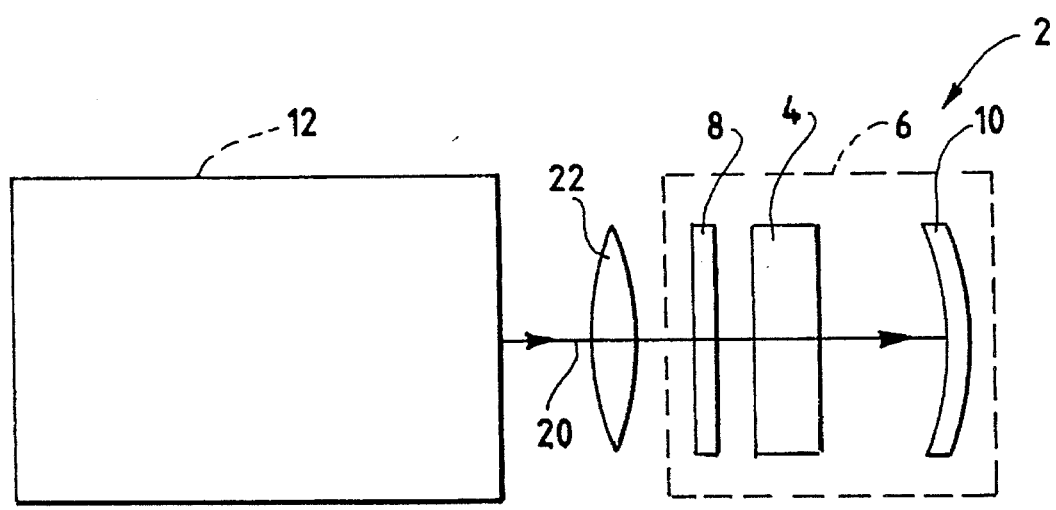
FIG. 1 is a schematic diagram of a laser system 2 that is suitable for incorporating the present invention.

Referring to the drawings, wherein reference characters designate like or corresponding parts throughout the views, FIG. 1 is a schematic diagram of a laser system 2 that is suitable for incorporating the present invention. The laser system 2 comprises a lasant material 4 within an optical cavity 6 formed by a reflector 8 and an output coupler 10. The lasant material 4 preferably comprises a fluoride crystal host, such as barium yttrium fluoride. Alternatively, the lasant material 4 may comprise a glass host, such as a fluoride glass host.

The lasant material 4 also comprises a rare earth activator material, such as thulium, that is preferably doped in the host. The concentration of thulium as a percentage of available rare earth sites in the host is in the range of 0.1 to 10 percent, preferably between approximately 0.1 and 2 percent, and ideally approximately 0.5 percent when the host comprises barium yttrium fluoride. Alternatively, erbium or holmium are suitable activator materials that may be doped in the host. The lasant material further comprises a sensitizer material, such as ytterbium, that is also preferably doped in the host. The concentration of ytterbium as a percentage of available rare earth sites in the host is in the range of 1 to 99.9 percent, preferably between approximately 5 and 99.9 percent, and ideally approximately 50 percent when the host comprises barium yttrium fluoride.

The laser system 2 also comprises a substantially single band pumping source 12 that comprises a source of at least quasi-continuous optical pumping radiation having at least one wavelength suitable for pumping the lasant material 4, this wavelength being in the infrared region of the electromagnetic spectrum. The pumping radiation provided by the pumping source 12 has a wavelength in the range of 830 to 1100 nm, preferably between approximately 920 and 1000 nm, and ideally the wavelength is approximately 960 nm.

Although the pumping source 12 is most advantageously a laser diode from the standpoint of economy and simplicity, for the suitable range of output wavelengths for the pumping radiation described above, it may alternatively comprise a solid state laser, such as a titanium sapphire laser that provides single band coherent radiation having a wavelength in the range of 830 to 1100 nm, preferably between 920 and 1000, and ideally the wavelength is approximately 960 nm.

The pumping radiation produced by the pumping source 12 passes through a focussing lens 22 and penetrates the optical cavity 6 through the reflector 8 along an optical path 20 to impinge at least one surface of the lasant material 4. To this end, the reflector 8 is highly reflective at lasing wavelengths for which the laser system 2 is adjusted to provide coherent output radiation. If non-resonant pumping is desired, the reflector 8 is relatively transparent for wavelengths corresponding to the pumping radiation. If resonant pumping is desired, for instance, when the lasant material 4 is weakly absorbent for the pumping radiation or relatively thin, the reflector 8 is sufficiently reflective for wavelengths corresponding to the pumping radiation. The focussing lens 22 is useful to focus the pumping radiation from the pumping source 12 on the lasant material 4.

Figure 2:
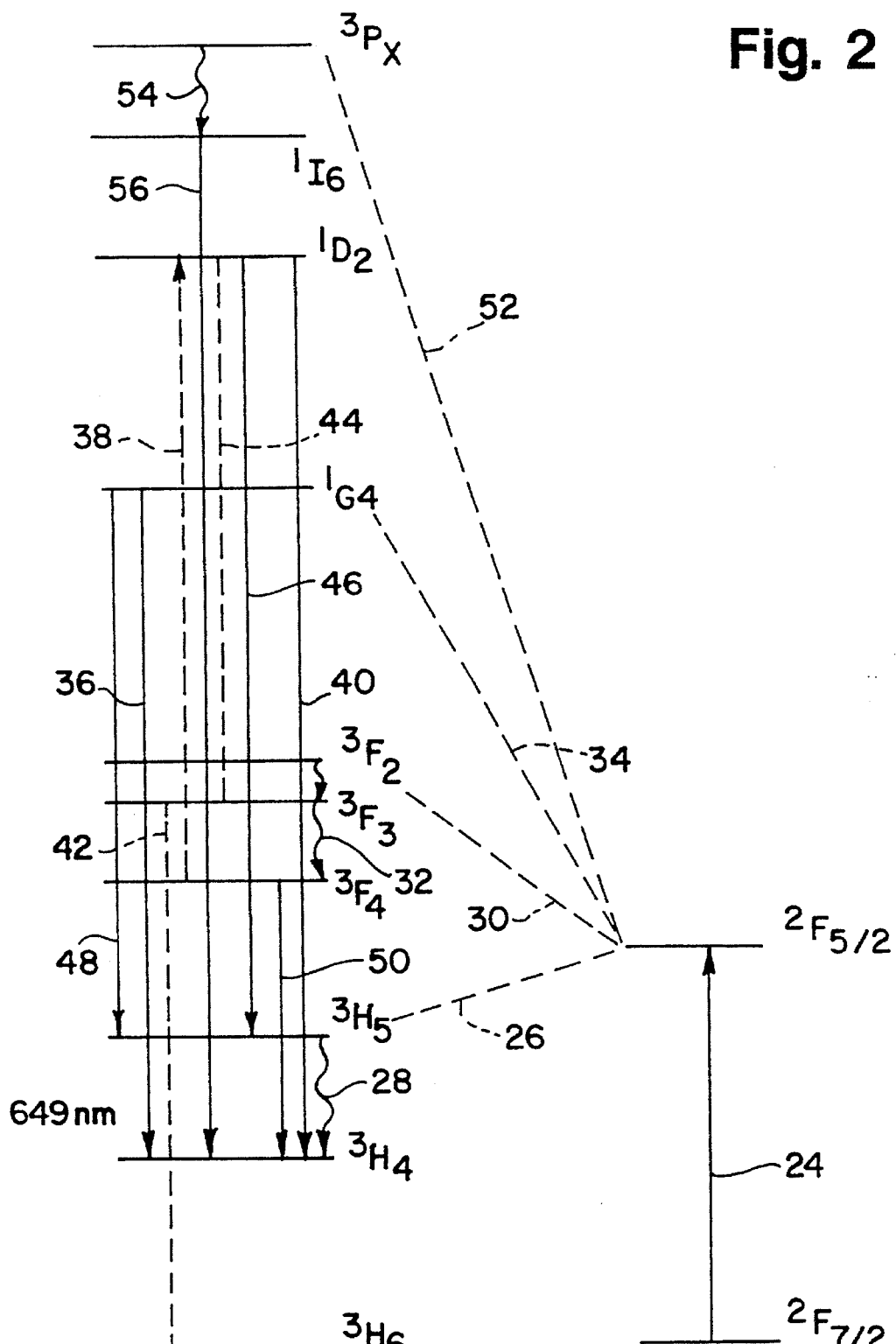
FIG. 2 is an energy state diagram for a first upconversion system according to the invention.

FIG. 2 is an energy level diagram that shows how the present invention produces upconversion action with three successive transfers of energy from the ytterbium sensitizer ions to the thulium activator ions that are doped in the lasant material 4. When the wavelength of the pumping radiation from the pumping source 12 along the optical path 20 is adjusted to be in the range of 830 to 1100 nm, the quantum energy level of at least some of the ytterbium sensitizer ions in the lasant material 4 is raised from the $^2F_{7/2}$ state to the $^2F_{5/2}$ state by absorption of the pumping radiation, as represented by a vector 24.

The quantum energy level of the ytterbium ions in the $^2F_{5/2}$ state then decays back to the $^2F_{7/2}$ state. In a first energy transfer from the sensitizer to the activator, the quantum energy level of at least some of the thulium activator ions is raised to the $^3H_5$ state from the $^3H_6$ state by substantially non-radiative transfer of energy that is released by the decay of the quantum energy level of the ytterbium sensitizer ions from the $^2F_{5/2}$ state back to the $^2F_{7/2}$ state, as represented by a broken line 26. The quantum energy level of the thulium ions in the $^3H_5$ state then rapidly decays, substantially non-radiatively, to the $^3H_4$ state, as represented by a wavy vector 28.

In a second energy transfer from the sensitizer to the activator, the quantum energy level of at least some of the thulium activator ions is raised to the $^3F_2$ state from the $^3H_4$ state by substantially non-radiative transfer of energy that is released by a subsequent decay of the quantum energy level of the ytterbium sensitizer ions from the $^2F_{5/2}$ state back to the $^2F_{7/2}$ state, as represented by a broken line 30. The quantum energy level of the thulium ions in the $^3F_2$ state then rapidly decays substantially non-radiatively first to the $^3F_3$ state, and then to the $^3F_4$ state, as represented by a wavy vector 32.

In a third energy transfer from the sensitizer to the activator, the quantum energy level of at least some of the thulium activator ions is raised to the $^1G_4$ state from the $^3F_4$ state by substantially non-radiative transfer of energy that is released by a subsequent decay of the quantum energy level of the ytterbium sensitizer ions from the $^2F_{5/2}$ state back to the $^2F_{7/2}$ state, as represented by a broken line 34. The quantum energy level of the thulium ions in the $^1G_4$ state then radiatively decays to the $^3H_4$ state, as represented by a vector 36. The energy that is radiated by the decay of the thulium ions in the $^1G_4$ state to the $^3H_4$ state has a wavelength of approximately 649 nm. If the optical cavity 6 is made resonant for this wavelength, the reflector 8 has high reflectance for this wavelength and the output coupler 10 has sufficient reflectance at this wavelength to sustain lasing action, an upconversion laser system that operates with three successive energy transfers between the sensitizer and activator ions is secured.

Lasing can be produced at other wavelengths with this upconversion system. For instance, if the optical cavity is made resonant for a wavelength of approximately 455 nm, and the reflector 8 and the output coupler are both sufficiently reflective for a wavelength of approximately 649 nm, lasing action can be sustained at a wavelength of approximately 455 nm. This lasing action is due to either one, or both, of the following mechanisms that occur as a result of the three successive energy transfers to the thulium activator ions.

One mechanism is absorption of the radiation having a wavelength of approximately 649 nm that is produced by the decay of the quantum energy level of at least some of the thulium activator ions from the $^1G_4$ state to the $^3H_4$ state. This radiation is absorbed by at least some of the thulium activator ions that have a quantum energy level in the $^3F_4$ state as a result of the second energy transfer from the ytterbium sensitizer ions to the thulium activator ions described above.

The absorption of this radiation causes the quantum energy level of these ions to be raised to the $^1D_2$ state from the $^3F_4$ state, as represented by a broken line 38. The quantum energy level of the thulium ions in the $^1D_2$ state then radiatively decays to the $^3H_4$ state, as represented by a vector 40. The energy that is radiated by the decay of the thulium ions in the $^1D_2$ state to the $^3H_4$ state has a wavelength of approximately 455 nm. Since the optical cavity 6 is made resonant for this wavelength in this case, lasing can occur at this wavelength if enough energy transfer is provided by this mechanism.

Another mechanism that can produce radiation at approximately 455 nm is due to ion-to-ion energy transfer that can occur between at least some of those thulium activator ions occupying a quantum energy level in the $^3F_3$ state as a result of the second energy transfer from the ytterbium sensitizer ions to the thulium activator ions described above. In this case, the ion-to-ion energy transfer causes one energy releasing thulium activator ion that has a quantum energy level in the $^3F_3$ state to return to the $^3H_6$ state as represented by a broken line 42 and one energy absorbing thulium activator ion to have its quantum energy level raised to the $^1D_2$ state from the $^3F_3$ state as represented by a broken line 44.

The quantum energy level of the thulium ions in the $^1D_2$ state then radiatively decays to the $^3H_4$ state, as represented by the vector 40. The energy that is radiated by the decay of the thulium ions in the $^1D_2$ state to the $^3H_4$ state has a wavelength of approximately 455 nm. Since the optical cavity 6 is made resonant for this wavelength, lasing can occur at this wavelength if enough energy transfer is provided by this mechanism.

Even if the two mechanisms described above in connection with raising the quantum energy level of at least some of the thulium activator ions to the $^1D_2$ state are not by themselves capable of transferring sufficient energy to provide lasing at a wavelength of approximately 455 nm, the two mechanisms may be combined to provide sufficient energy transfer. If either one of the mechanisms is sufficient, however, the ion-to-ion mechanism is preferred.

Furthermore, a fourth transfer of energy from the sensitizer to the activator may occur, wherein the quantum energy level of at least some of the thulium activator ions is raised to the $^3P_x$ manifold from the $^1D_2$ state by substantially non-radiative transfer of energy that is released by a subsequent decay of the quantum energy level of the ytterbium sensitizer ions from the $^2F_{5/2}$ state back to the $^2F_{7/2}$ state, as represented by a broken line 52. The quantum energy level of the thulium ions in the $^3P_x$ manifold then substantially non-radiatively decay to the $^1I_6$ state, as represented by a wavy vector 54. The quantum energy level of at least some of the thulium in the $^1I_6$ state then radiatively decays to the $^3H_4$ state, as represented by a vector 56. The energy that is radiated by the decay of the thulium ions in the $^1I_6$ state to the $^3H_4$ state has a wavelength of approximately 350 nm. If the optical cavity 6 is made resonant for this wavelength, the reflector 8 has high reflectance for this wavelength and the output coupler 10 has sufficient reflectance at this wavelength to sustain lasing action, an upconversion laser system that includes four successive energy transfers between the sensitizer and activator ions is secured.

Similarly, the upconversion system according to the invention as described above may provide lasing radiation having still other wavelengths that correspond to the decay of the quantum energy level of at least some of the thulium activator ions in the $^1D_2$ state to other states. For instance, at least some of the thulium activator ions in the $^1D_2$ state may decay to the $^3H_5$ state, producing substantially radiative decay that produces radiation having a wavelength of approximately 510 nm, as represented by a vector 46. If the optical cavity 6 is made resonant for approximately this wavelength and sufficient energy transfer is achieved, lasing can occur at this wavelength.

Likewise, the upconversion system according to the invention as described above may provide lasing radiation having still other wavelengths that correspond to the decay of the quantum energy level of at least some of the thulium activator ions in the $^1G_4$ state to other states. For instance, at least some of the thulium activator ions in the $^1G_4$ state may decay to the $^3H_5$ state, producing substantially radiative decay that produces radiation having a wavelength of approximately 799 nm, as represented by a vector 48. If the optical cavity 6 is made resonant for approximately this wavelength and sufficient energy transfer is achieved, lasing can occur at this wavelength.

The upconversion laser system 2 as shown in FIG. 1 may be used to provide lasing radiation at still other wavelengths with only two energy transfers from at least some of the ytterbium sensitizer ions to at least some of the thulium activator ions. In this case, at least some of the thulium activator ions that have a quantum energy level that has been raised to the $^3F_4$ state as a result of the second transfer of energy from at least some of the ytterbium sensitizer ions as described above are allowed to decay to the $^3H_4$ state. Radiation that has a wavelength of approximately 1.48 μm is produced as a result oil this decay, as represented by a vector 50. If the optical cavity 6 is made resonant at approximately 1.48 μm, and sufficient energy transfer is achieved, lasing can occur at this wavelength.

In a specific implementation of the present invention as described above, the lasant material 4 comprises $BaY_{1.0}Yb_{0.99}Tm_{0.01}F_8$. The pumping source 12 typically comprises one or more laser diodes. In this case, the pumping source 12 supplies an output of approximately 100 mW at a wavelength of approximately 960 nm. The pumping source 12 alternatively may comprise a titanium sapphire laser. In this case, the pumping source 12 supplies an output of approximately 1 W at a wavelength of approximately 960 nm. The output of the pumping source 12 may be made quasi-continuous, such as with a chopper wheel, if desired, to prevent the lasant material 4 from overheating. Alternatively, the lasant material 4 may be suitably heat sunk or cooled to insure proper operation without overheating.

Of course, as noted above, the laser system 2 as described in connection with FIG. 1 operates in a similar fashion when the lasing material 4 comprises other rare earth activator ions, such as erbium or holmium, that are doped in the host. When erbium is selected as the activator material, the concentration of erbium as a percentage of available rare earth sites in the host is in the range of 0.1 to 10 percent, preferably between approximately 0.1 and 2 percent, and ideally approximately 0.5 percent when the host comprises barium yttrium fluoride. The concentration of ytterbium as a percentage of available rare earth sites in the host is in the range of 1 to 99.9 percent, preferably between approximately 5 and 99.9 percent, and ideally approximately 25 percent when the host comprises barium yttrium fluoride.

Also as described above, the substantially single band pumping source 12 comprises a source of at least quasi-continuous optical pumping radiation having at least one wavelength suitable for pumping the lasant material 4, this wavelength being in the infrared region of the electromagnetic spectrum. The pumping radiation provided by the pumping source 12 has a wavelength in the range of 830 to 1100 nm, preferably between approximately 920 and 1000 nm, and ideally the wavelength is approximately 960 nm.

Figure 3:
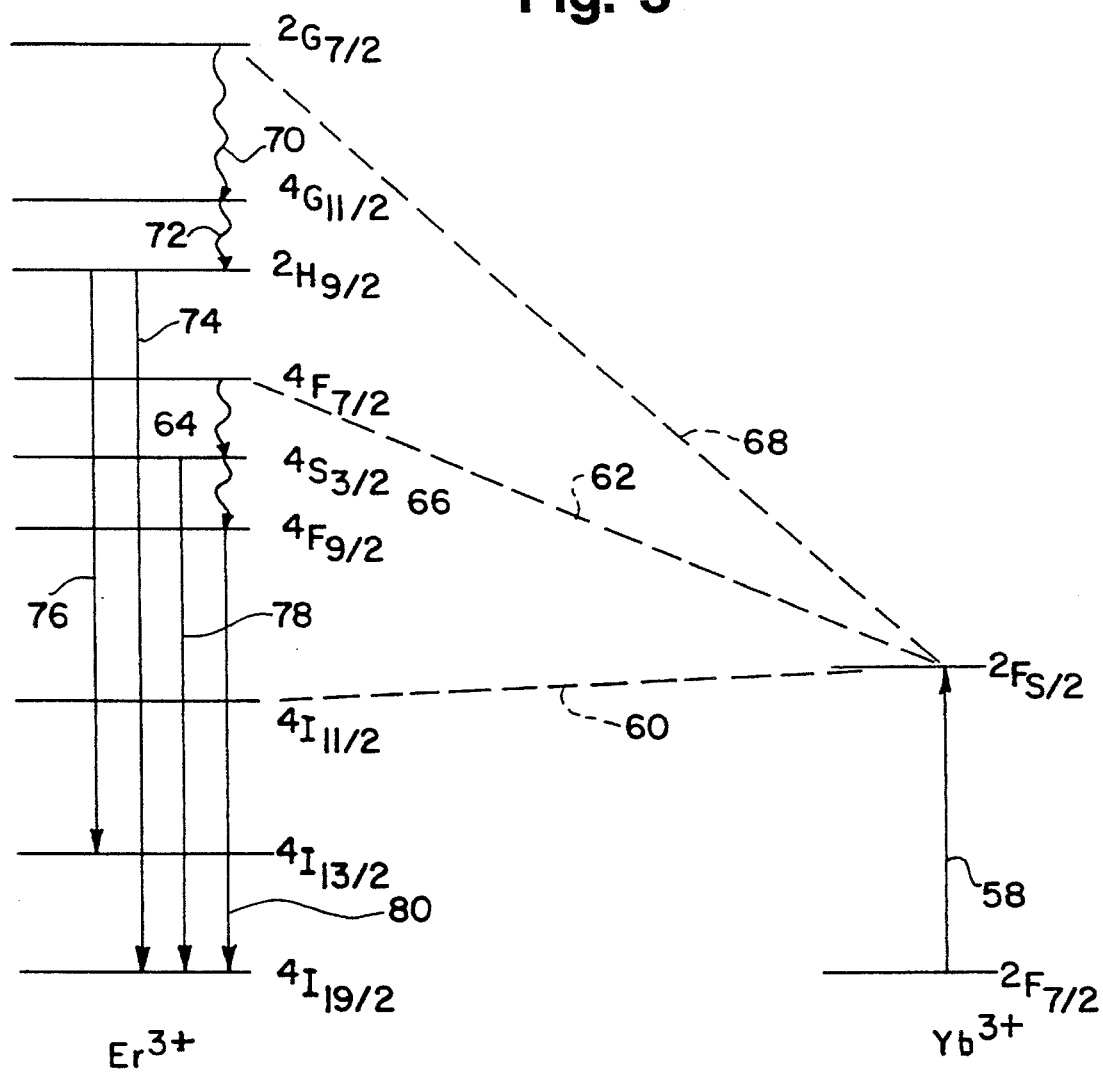
FIG. 3 is one alternate energy state diagram for the upconversion system according to the invention.

FIG. 3 is an energy level diagram that shows how the present invention produces upconversion action with two successive transfers of energy from the ytterbium sensitizer ions to the erbium activator ions that are doped in the lasant material 4. When the wavelength of the pumping radiation from the pumping source 12 along the optical path 20 is adjusted to be in the range of 830 to 1100 nm, the quantum energy level of at least some of the ytterbium sensitizer ions in the lasant material 4 is raised from the $^2F_{7/2}$ state to the $^2F_{5/2}$ state by absorption of the pumping radiation, as represented by a vector 58.

The quantum energy level of the ytterbium ions in the $^2F_{5/2}$ state then decays back to the $^2F_{7/2}$ state. In a first energy transfer from the sensitizer to the activator, the quantum energy level of at least some of the erbium activator ions is raised to the $^4I_{11/2}$ state from the $^4I_{15/2}$ state by substantially non-radiative transfer of energy that is released by the decay of the quantum energy level of the ytterbium sensitizer ions from the $^2F_{5/2}$ state back to the $^2F_{7/2}$ state, as represented by a broken line 60.

In a second energy transfer from the sensitizer to the activator, the quantum energy level of at least some of the erbium activator ions is raised to the $^4F_{7/2}$ state from the $^4I_{11/2}$ state by substantially non-radiative transfer of energy that is released by a subsequent decay of the quantum energy level of the ytterbium sensitizer ions from the $^2F_{5/2}$ state back to the $^2F_{7/2}$ state, as represented by a broken line 62. The quantum energy level of the erbium ions in the $^4F_{7/2}$ state then rapidly decays, substantially non-radiatively, first to the $^4S_{3/2}$ state, as represented by a wavy vector 64, and then to the $^4F_{9/2}$ state, as represented by a wavy vector 66.

In a third energy transfer from the sensitizer to the activator, the quantum energy level of at least some of the erbium activator ions is raised to the $^2G_{7/2}$ state from the $^4S_{3/2}$ state by substantially non-radiative transfer of energy that is released by a subsequent decay of the quantum energy level of the ytterbium sensitizer ions from the $^2F_{5/2}$ state back to the $^2F_{7/2}$ state, as represented by a broken line 68. The quantum energy level of the erbium ions in the $^2G_{7/2}$ state then rapidly decays, substantially non-radiatively, first to the $^4G_{11/2}$ state, as represented by a wavy vector 70, then to the $^2H_{9/2}$ state, as represented by a wavy vector 72.

The quantum energy level of at least some of the erbium ions in the $^2H_{9/2}$ state then radiatively decays to the $^4I_{15/2}$ state, as represented by a vector 74. The energy that is radiated by the decay of the erbium ions in the $^2H_{9/2}$ state to the $^4I_{15/2}$ state has a wavelength of approximately 415 nm. If the optical cavity 6 is made resonant for this wavelength, the reflector 8 has high reflectance for this wavelength and the output coupler 10 has sufficient reflectance at this wavelength to sustain lasing action, an upconversion laser system that includes three successive energy transfers between the sensitizer and activator ions is secured.

Alternatively, the quantum energy level of at least some of the erbium ions in the $^2H_{9/2}$ state radiatively decays to the $^4I_{13/2}$ state, as represented by a vector 76. The energy that is radiated by the decay of the erbium ions in the $^2H_{9/2}$ state to the $^4I_{13/2}$ state has a wavelength of approximately 562 nm. If the optical cavity 6 is made resonant for this wavelength and sufficient energy transfer is achieved, lasing can occur at this wavelength.

In a specific implementation of the present invention as described above, the lasant material 4 comprises $BaY_{1.5}Yb_{0.49}Er_{0.01}F_8$. The pumping source 12 typically comprises one or more laser diodes. In this case, the pumping source 12 supplies an output of approximately 100 mW at a wavelength of approximately 960 nm. The pumping source 12 alternatively may comprise a titanium sapphire laser. In this case, the pumping source 12 supplies an output of approximately 1 W at a wavelength of approximately 960 nm. The output of the pumping source 12 may be made quasi-continuous, such as with a chopper wheel, if desired, to prevent the lasant material 4 from overheating. Alternatively, the lasant material 4 may be suitably heat sunk or cooled to insure proper operation without overheating.

Likewise, the upconversion system according to the invention as described above in connection with FIG. 3 wherein the lasant material 4 comprises erbium ions may provide lasing radiation having still other wavelengths with only two energy transfers from at least some of the ytterbium sensitizer ions to at least some of the erbium activator ions. In this case, the wavelength can correspond to the decay of the quantum energy level of at least some of the erbium activator ions in the $^4F_{7/2}$ state to other states.

For instance, at least some of the erbium activator ions in the $^4F_{7/2}$ state may first decay substantially non-radiatively to the $^4S_{3/2}$ state, then substantially radiatively decay from the $^4S_{3/2}$ state to the $^4I_{15/2}$ state to produce radiation that has a wavelength of approximately 550 nm, as represented by a vector 78. If the optical cavity 6 is made resonant for approximately this wavelength and sufficient energy transfer is achieved, lasing can occur at this wavelength.

Similarly, at least some of the erbium activator ions in the $^4F_{7/2}$ state may first decay substantially non-radiatively to the $^4S_{3/2}$ state as represented by the wavy vector 64, then to the $^4F_{9/2}$ state as represented by the wavy vector 66, and then decay substantially radiatively from the $^4F_{9/2}$ state to the $^4I_{15/2}$ state with radiation that has a wavelength of approximately 670 nm, as represented by a vector 80. If the optical cavity 6 is made resonant for approximately this wavelength and sufficient energy transfer is achieved, lasing can occur at this wavelength.

When holmium is selected as the activator material, the concentration of holmium as a percentage of available rare earth sites in the host is in the range of 0.1 to 10 percent, preferably between approximately 0.1 and 2 percent, and ideally approximately 0.4 percent when the host comprises potassium yttrium fluoride ($KYF_4$). The concentration of ytterbium as a percentage of available rare earth sites in the host is in the range of 1 to 99.9 percent, preferably between approximately 5 and 99.9 percent, and ideally approximately 10 percent when the host comprises potassium yttrium fluoride.

Also as described above, the substantially single band pumping source 12 comprises a source of at least quasi-continuous optical pumping radiation having at least one wavelength suitable for pumping the lasant material 4, this wavelength being in the infrared region of the electromagnetic spectrum. The pumping radiation provided by the pumping source 12 has a wavelength in the range of 830 to 1100 nm, preferably between approximately 920 and 1000 nm, and ideally the wavelength is approximately 970 nm.

Figure 4:
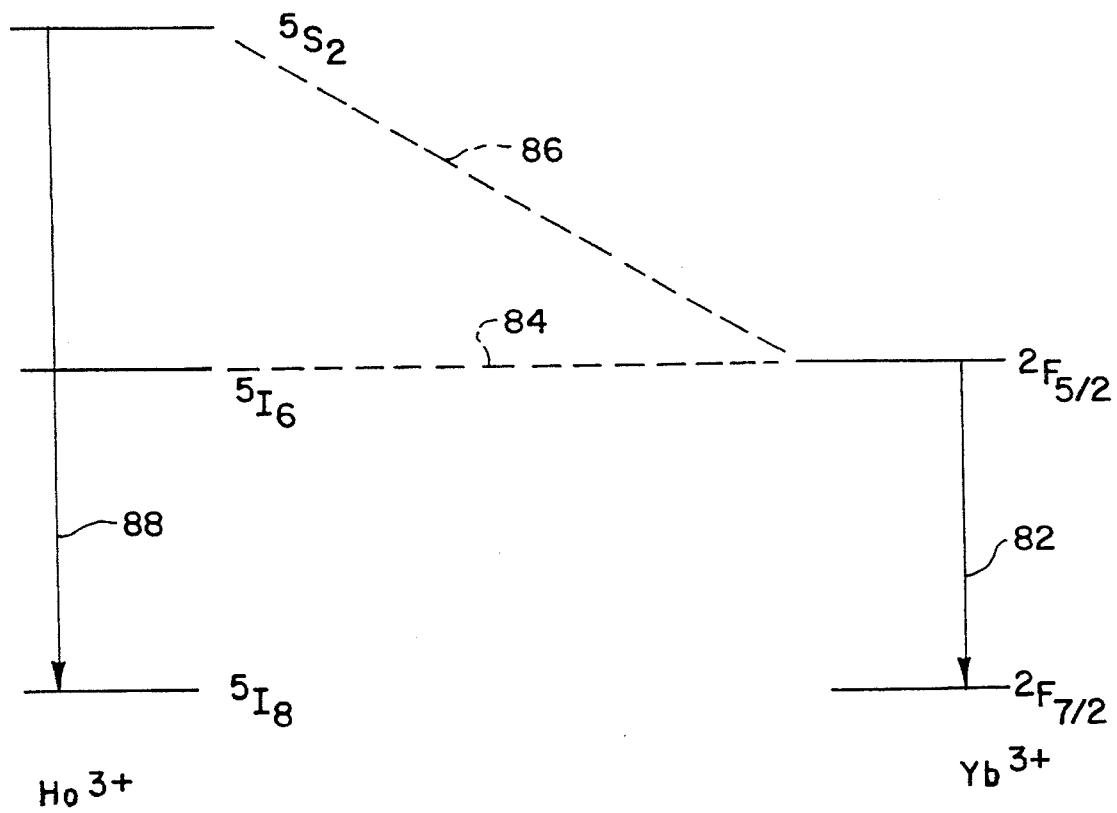
FIG. 4 is another alternate energy state diagram for the upconversion system according to the invention.

FIG. 4 is an energy level diagram that shows how the present invention produces upconversion action with two successive transfers of energy from the ytterbium sensitizer ions to the activator ions that are doped in the lasant material 4 when the activator material comprises holmium. When the wavelength of the pumping radiation from the pumping source 12 along the optical path 20 is adjusted to be in the range of 830 to 1100 nm, the quantum energy level of at least some of the ytterbium sensitizer ions in the lasant material 4 is raised from the $^2F_{7/2}$ state to the $^2F_{5/2}$ state by absorption of the pumping radiation, as represented by a vector 82.

The quantum energy level of the ytterbium ions in the $^2F_{5/2}$ state then decays back to the $^2F_{7/2}$ state. In a first energy transfer from the sensitizer to the activator, the quantum energy level of at least some of the holmium activator ions is raised to the $^5I_6$ state from the $^5I_8$ state by substantially non-radiative transfer of energy that is released by the decay of the quantum energy level of the ytterbium sensitizer ions from the $^2F_{5/2}$ state back to the $^2F_{7/2}$ state, as represented by a broken line 84.

In a second energy transfer from the sensitizer to the activator, the quantum energy level of at least some of the holmium activator ions is raised to the $^5S_2$ state from the $^5I_6$ state by substantially non-radiative transfer of energy that is released by a subsequent decay of the quantum energy level of the ytterbium sensitizer ions from the $^2F_{5/2}$ state back to the $^2F_{7/2}$ state, as represented by a broken line 86. The quantum energy level of the holmium ions in the $^5S_2$ state then radiatively decays to the $^5I_8$ state, as represented by a vector 88. The energy that is radiated by the decay of the holmium ions from the $^5S_2$ state to the $^5I_8$ state has a wavelength of approximately 550 nm. If the optical cavity 6 is made resonant for this wavelength, the reflector 8 has high reflectance for this wavelength and the output coupler 10 has sufficient reflectance at this wavelength to sustain lasing action, an upconversion laser system that includes two successive energy transfers between the sensitizer and activator ions is secured.

In a specific implementation of the present invention as described above, the lasant material 4 comprises $KY_{0.898}Yb_{0.1}Ho_{0.002}F_4$. The pumping source 12 typically comprises one or more laser diodes. In this case, the pumping source 12 supplies an output of approximately 100 mW at a wavelength of approximately 970 nm. The pumping source 12 alternatively may comprise a titanium sapphire laser. In this case, the pumping source 12 supplies an output of approximately 1 W at a wavelength of approximately 960 nm. The output of the pumping source 12 may be made quasi-continuous, such as with a chopper wheel, if desired, to prevent the lasant material 4 from overheating. Alternatively, the lasant material 4 may be suitably heat sunk or cooled to insure proper operation without overheating.

The present invention may be used in laser systems other than shown in FIG. 1 if desired. For instance, the lasant material 4 may be intra-cavity pumped instead of being pumped with a separate pumping source 12. In such instance, the lasant material 4 is placed within a portion of the optical cavity of the pumping source 12. Such a configuration may be desirable to achieve higher pumping efficiency or better economy. The present invention may also be used in ring cavity laser systems. Likewise, the lasant material 4 may comprise an optical fiber host, and the optical cavity 6 may comprise a length of the optical fiber host that is used in combination with suitable fiber optic couplings that approximate the functions of the reflector 8 and the output coupler 10 shown in FIG. 1.

Thus, there has been described herein an upconversion laser system that uses solid state components throughout and achieves such operation with a continuous or quasi-continuous pumping source using successive energy transfers between the sensitizer and activator in the host of the lasant upconversion material.

What is claimed is:

1. An upconversion laser system for convening relatively long wavelength, substantially coherent single band infrared radiation that is at least quasi-continuous to relatively short wavelength optical radiation, comprising:

a pumping source that has at least a quasi-continuous output of said substantially coherent single band infrared radiation;

an active lasant material comprising a fluoride crystal host, a sensitizer comprising a concentration of ytterbium sensitizer ions in said host that has a quantum energy level that is shifted from the $^4F_{5/2}$ state to the $^4F_{7/2}$ state by absorption of said infrared radiation and rapidly decay back to said $^4F_{5/2}$ state, an activator comprising a concentration of thulium activator ions in said host, as a percentage of available rare earth sites in said host in the range of 0.1 to 10 percent, that accept energy from at least some of said sensitizer ions that decay from said $^4F_{7/2}$ state to said $^4F_{5/2}$ state by substantially non-radiative transfer so that at least some of said activator ions have quantum energy levels that are raised from the $^3H_6$ state through at least one intermediate state to a relatively highest state during successive ones of said energy transfers from said sensitizer ions to said activator ions, and rapidly decay from said highest state to a relatively low state to produce substantially coherent radiation that has a shorter wavelength than said infrared radiation; and an optical cavity for resonating said coherent radiation produced by said lasant material.

2. An upconversion laser system for converting relatively long wavelength, substantially coherent single band infrared radiation that is at least quasi-continuous to relatively short wavelength optical radiation, comprising:

a pumping source that has at least a quasi-continuous output of said substantially coherent single band infrared radiation;

an active lasant material comprising a fluoride crystal host, a sensitizer comprising a concentration of ytterbium sensitizer ions in said host that has a quantum energy level that is shifted from the $^4F_{5/2}$ state to the $^4F_{7/2}$ state by absorption of said infrared radiation and rapidly decay back to said $^4F_{5/2}$ state, an activator comprising a concentration of erbium activator ions in said host, as a percentage of available rare earth sites in said host in the range of 0.1 to 10 percent, that accept energy from at least some of said sensitizer ions that decay from said $^4F_{7/2}$ state to said $^4F_{5/2}$ state by substantially non-radiative transfer so that at least some of said activator ions have quantum energy levels that are raised from the $^4I_{15/2}$ state through at least one intermediate state to a relatively highest stare during successive ones of said energy transfers from said sensitizer ions to said activator ions, and rapidly decay from said highest state to a relatively low state to produce substantially coherent radiation that has a shorter wavelength than said infrared radiation; and an optical cavity for resonating said coherent radiation produced by said lasant material.

3. An upconversion laser system for converting relatively long wavelength, substantially coherent single band infrared radiation that is at least quasi-continuous to relatively short wavelength optical radiation, comprising:

a pumping source that has at least a quasi-continuous output of said substantially coherent single band infrared radiation;

an active lasant material comprising a fluoride crystal host, a sensitizer comprising a concentration of ytterbium sensitizer ions in said host that has a quantum energy level that is shifted from the $^4F_{5/2}$ state to the $^4F_{7/2}$ state by absorption of said infrared radiation and rapidly decay back to said $^4F_{5/2}$ state, an activator comprising a concentration of holmium activator ions in said host, as a percentage of available rare earth sites in said host in the range of 0.1 to 10 percent, that accept energy from at least some of said sensitizer ions that decay from said $^4F_{7/2}$ state to said $^4F_{5/2}$ state by substantially non-radiative transfer so that at least some of said activator ions have quantum energy levels that are raised from the $^5I_8$ state through at least one intermediate state to a relatively highest state during successive ones of said energy transfers from said sensitizer ions to said activator ions, and rapidly decay from said highest state to a relatively low state to produce substantially coherent radiation that has a shorter wavelength than said infrared radiation; and an optical cavity for resonating said coherent radiation produced by said lasant material.

4. An upconversion laser system for converting relatively long wavelength, substantially coherent single band infrared radiation that is at least quasi-continuous to relatively short wavelength optical radiation, comprising:

a pumping source that has at least a quasi-continuous output of said substantially coherent single band infrared radiation;

an active lasant material comprising a fluoride glass host, a sensitizer comprising a concentration of ytterbium sensitizer ions in said host that has a quantum energy level that is shifted from the $^4F_{5/2}$ state to the $^4F_{7/2}$ state by absorption of said infrared radiation and rapidly decay back to said $^4F_{5/2}$ state, an activator comprising a concentration of thulium activator ions in said host, as a percentage of available rare earth sites in said host in the range of 0.1 to 10 percent, that accept energy from at least some of said sensitizer ions that decay from said $^4F_{7/2}$ state to said $^4F_{5/2}$ stat by substantially non-radiative transfer so that at least some of said activator ions have quantum energy levels that are raised from the $^3H_6$ state through at least one intermediate state to a relatively highest state during successive ones of said energy transfers from said sensitizer ions to said activator ions, and rapidly decay from said highest state to a relatively low state to produce substantially coherent radiation that has a shorter wavelength than said infrared radiation; and an optical cavity for resonating said coherent radiation produced by said lasant material.

5. An upconversion laser system for convening relatively long wavelength, substantially coherent single band infrared radiation that is at least quasi-continuous to relatively short wavelength optical radiation, comprising:

a pumping source that has at least a quasi-continuous output of said substantially coherent single band infrared radiation;

an active lasant material comprising a fluoride glass host, a sensitizer comprising a concentration of ytterbium sensitizer ions in said host that has a quantum energy level that is shifted from the $^4F_{5/2}$ state to the $^4F_{7/2}$ state by absorption of said infrared radiation and rapidly decay back to said $^4F_{5/2}$ state, an activator comprising a concentration of erbium activator ions in said host, as a percentage of available rare earth sites in said host in the range of 0.1 to 10 percent, that accept energy from at least some of said sensitizer ions that decay from said $^4F_{7/2}$ state to said $^4F_{5/2}$ state by substantially non-radiative transfer so that at least some of said activator ions have quantum energy levels that are raised from the $^4I_{15/2}$ state through at least one intermediate state to a relatively highest state during successive ones of said energy transfers from said sensitizer ions to said activator ions, and rapidly decay from said highest state to a relatively low state to produce substantially coherent radiation that has a shorter wavelength than said infrared radiation; and an optical cavity for resonating said coherent radiation produced by said lasant material.

6. An upconversion laser system for converting relatively long wavelength, substantially coherent single band infrared radiation that is at least quasi-continuous to relatively short wavelength optical radiation, comprising:

a pumping source that has at least a quasi-continuous output of said substantially coherent single band infrared radiation;

an active lasant material comprising a fluoride glass host, a sensitizer comprising a concentration of ytterbium sensitizer ions in said host that has a quantum energy level that is shifted from the $^4F_{5/2}$ state to the $^4F_{7/2}$ state by absorption of said infrared radiation and rapidly decay back to said $^4F_{5/2}$ state, an activator comprising a concentration of holmium activator ions in said host, as a percentage of available rate earth sites in said host in the range of 0.1 to 10 percent, that accept energy from at least some of said sensitizer ions that decay from said $^4F_{7/2}$ state to said $^4F_{5/2}$ state by substantially non-radiative transfer so that at least some of said activator ions have quantum energy levels that are raised from the $^5I^8$ state through at least one intermediate state to a relatively highest state during successive ones of said energy transfers from said sensitizer ions to said activator ions, and rapidly decay from said highest state to a relatively low state to produce substantially coherent radiation that has a shorter wavelength than said infrared radiation; and an optical cavity for resonating said coherent radiation produced by said lasant material.

\* \* \* \* \*

UNITED STATES PATENT AND TRADEMARK OFFICE
CERTIFICATE OF CORRECTION

PATENT NO. : 5,488,624

DATED : January 30, 1996

INVENTOR(S) : Robert J. Thrash & Leo F. Johnson

It is certified that error appears in the above-indentified patent and that said Letters Patent is hereby corrected as shown below:

ON THE TITLE PAGE:

Item [56], "Related U.S. Application Data" section, "D. 341,719" should read --5,299,215--.

Column 1, Line 8, "D 341,719" should read --5,299,215--.

Signed and Sealed this

Second Day of September, 1997

Attest:

BRUCE LEHMAN

Attesting Officer

Commissioner of Patents and Trademarks